United States Patent [19]

Wagner

[11] 4,310,502
[45] Jan. 12, 1982

[54] SINGLET DELTA OXYGEN GENERATOR AND PROCESS

[75] Inventor: Ross I. Wagner, Woodland Hills, Calif.

[73] Assignee: Rockwell International Corporation, El Segundo, Calif.

[21] Appl. No.: 154,268

[22] Filed: May 29, 1980

[51] Int. Cl.$^3$ ............................................ C01B 13/00
[52] U.S. Cl. .............................. 423/579; 331/94.5 G; 422/120
[58] Field of Search .................. 423/579; 331/94.5 G; 422/120

[56] References Cited

U.S. PATENT DOCUMENTS 3,917,811 11/1975 Grout et al. ....................... 423/659
3,944,401 3/1976 Dörr et al. ......................... 423/552
4,246,252 1/1981 McDermott et al. ............... 423/579

OTHER PUBLICATIONS

Kirk-Othmer, *Encyclopedia of Chemical Technology*, Second Edition, vol. 9, (1966), Interscience Publishers, pp. 828, 829.
Bernard et al., "Efficient Operation of a 100-W Transverse-Flow Oxygen-Iodine Chemical Laser", Appl. Phys. Lett., 34 (1), Jan. 1, 1979, pp. 40, 41.

*Primary Examiner*—O. R. Vertiz
*Assistant Examiner*—Wayne A. Langel
*Attorney, Agent, or Firm*—H. F. Hamann; H. B. Field

[57] ABSTRACT

A singlet delta oxygen generator 10 comprises a static or motionless mixer 12 having a gas inlet 14 through which chlorine gas reactant is introduced into the static mixer and a liquid inlet 16 through which the basic sodium hydroxide/hydrogen peroxide solution is introduced. As the reactants pass through static mixer 12, the gaseous products and liquid by-products are formed. The product stream passes through liquid/gas separator 26 wherein the liquid by-product stream is diverted to sump 28 and the gaseous product stream is conveyed to a low volume trap 30. The temperature of trap 30 is maintained at approximately −80° C. so as to solidify and thereby remove any water or hydrogen peroxide vapor which might remain in the product stream. From the low volume trap 30, the product stream is then conveyed to chlorine trap 34 wherein any excess chlorine gas present in the system is retained.

16 Claims, 1 Drawing Figure

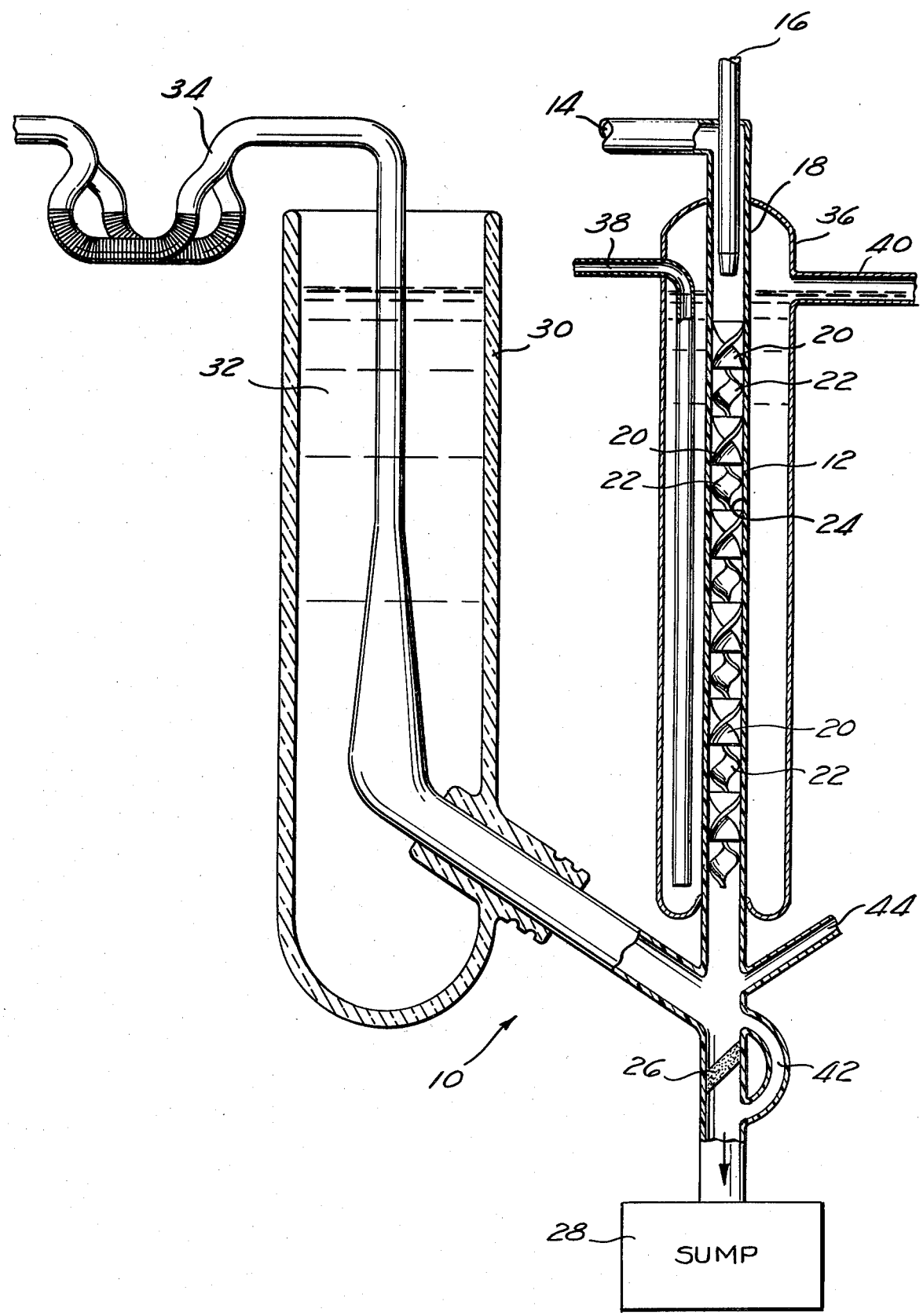

SINGLET DELTA OXYGEN GENERATOR AND PROCESS

BACKGROUND OF THE INVENTION

1. Field of the Invention

The present invention relates to laser systems and, more specifically, to a singlet delta oxygen generator and a process for producing singlet delta oxygen for use in iodine lasers.

2. Description of the Prior Art

Singlet delta oxygen $O_2(^1\Delta)$ is generated on contact of $Cl_2$ gas with an aqueous solution of basic $H_2O_2$ in accordance with the equation $$Cl_2 + H_2O_2 + 2NaOH \rightarrow O_2(^1\Delta) + 2NaCl + 2H_2O$$

However, the excited oxygen can be reduced to its unusable ground state, $O_2(^3\Sigma)$, by metal contact quenching, wall quenching, gas phase quenching, and liquid phase quenching. Therefore, to generate $O_2(^1\Delta)$ both efficiently and in high yield, the contacting device (reactor) for the gaseous and liquid reactants must provide a large interfacial area in a small volume for a short time, followed by rapid separation of the gaseous and liquid phases.

It should be noted that the closest related art is U.S. Pat. No. 4,102,950 to Pilipovich et al. wherein there is described and claimed a method and generator for producing singlet delta oxygen. In that system, a hypohalite selected from the group consisting of $BrSO_3F$, $BrNO_3$, $BrOCF_3$, $ClSO_3F$, $ClNO_3$, $ClOCF_3$, $FSO_3F$, $FOCF_3$, and $ISO_3F$, is reacted with hydrogen peroxide to produce singlet molecular oxygen. A preferred embodiment of the reaction is illustrated by the following example:

$$ClSO_3F + H_2O_2 \rightarrow O_2(^1\Delta g) + HSO_3F + HCl$$

The generator for producing the singlet molecular oxygen is a reactor vessel having nozzles for introducing the chlorine fluorosulfate and hydrogen peroxide into the vessel. An outlet is provided for withdrawing the products, and the singlet molecular oxygen is separated by condensing out the other products in a condensor.

SUMMARY OF THE INVENTION

Accordingly, there is provided by the present invention a singlet delta oxygen generator and process for making singlet delta oxygen. The generator comprises a static mixer such as Kenics or Luwa static mixer for reacting basic hydrogen peroxide with chlorine, a liquid/gas separator connected to the static mixer for separating the gaseous product stream from the liquid by-product, a low volume trap for cooling said gas stream to about $-80°$ C. so as to permit the removal of $H_2O_2$ and water vapor and reduce the vapor pressure of the system, and an optional chlorine trap to remove excess chlorine, if present.

OBJECTS OF THE INVENTION

Therefore, it is an object of the invention to provide a singlet delta oxygen generator capable of producing usable singlet delta oxygen in concentrations up to about 100%.

Another object of the invention is to provide a process for generating singlet delta oxygen in high concentrations.

Yet another object of the present invention is to eliminate the majority of liquid phase quenching of singlet delta oxygen.

Still another object of the present invention is to eliminate the majority of gas phase quenching of singlet delta oxygen.

Another object of the present invention is to eliminate wall quenching of the singlet delta oxygen.

Other objects, advantages and novel features of the present invention will become apparent from the following detailed description of the invention when considered in conjunction with the accompanying drawing.

BRIEF DESCRIPTION OF THE DRAWING

The FIGURE is a schematic representation of the singlet delta oxygen generator.

DESCRIPTION OF THE PREFERRED EMBODIMENTS

Turning now to the Figure, there is shown a schematic representation of the singlet delta oxygen generator generally designated 10. Generally, generator 10 comprises a static or motionless mixer 12, such as a Kenics or Luwa mixer, having a gas inlet 14 through which the chlorine gas reactant is introduced into the static mixer 12, and a liquid inlet 16 through which the basic sodium hydroxide-hydrogen peroxide solution is introduced. In its preferred configuration, gas inlet 14 and liquid inlet 16 are concentric; however, any initial blending means such as a "Y" connection could be used.

After the reactants are introduced into the top 18 of static mixer 12, they are conveyed down through a plurality of pairs of mixing elements 20 and 22. These elements 20 and 22 comprise a succession of left and right-hand helical elements juxtaposed at 90°. This element orientation produces three distinct mixing actions: First is a flow division wherein as the reactants encounter the leading edge of the first element they are divided into two streams which follow the contour of the element helix. At the following element, each half-stream is again bisected and opposite quarters combined. This creates a geometric progression of flow divisions according to the formula $S = 2^n$ where S is the number of striations produced and n is the number of elements in the unit. Second is radial mixing wherein as the processed reactants follow the element shape they are rotated around their own hydraulic center in the direction opposite to the twist of the element. This action continuously moves the reactants from the center of the mixer 12 toward the housing wall 24 and vice versa, thus homogenizing the stream radially. This radial action contributes to the extraordinary heat transfer capability of the unit and produces a self-cleaning effect by minimizing material buildup on the housing wall. Third is flow reversal wherein the element twist direction is alternated from one element to the next, the direction of the radial circulation is reversed at each element junction thereby producing a great deal of turbulence.

Although it is preferred to arrange to mixing element in pairs, they may be arranged individually in alternating sequence, thus making it possible to have an odd number of elements.

The preferred number of pairs of elements 20 and 22 depend upon the diameter and volumetric flow rate of the mixer 12. However, for the half-inch diameter mixer 12 six pairs are preferred, and for the quarter-inch mixer 12 three pairs of elements 20,22 are preferred.

As the products exit from the mixer 12, they encounter liquid/gas separator 26. Separator 26 comprises a porous plate which allows the liquid by-product to penetrate the separator and be conveyed away to any appropriate receptical such as sump 28. The gas by-pass 42 permits the otherwise trapped gaseous product to re-enter the product stream and allows the liquid stream to flow to the sump 28 without restriction. Concurrently, the gaseous product and gaseous contaminants are diverted to a Dewar low volume trap 30 where a Dry Ice/trichloroethylene bath 32 reduces product stream temperature to about −80° C. and, as such, reduces the vapor pressure of the gaseous $H_2O_2$ and $H_2O$ to almost zero. Although the preferred temperature of the low-volume trap is about −80° C., that temperature was primarily selected for convenience purposes since that is the temperature obtained by mixing Dry Ice and trichloroethylene. However, any temperature below about −50° C. is capable of removing the undesirable $H_2O$ and $H_2O_2$ vapor from the product stream and would, thus, function equally well.

Upon exiting from the low volume trap 30, the product stream enters optional chlorine trap 34 wherein excess chlorine, if present, is removed from the product stream leaving essentially a dry $O_2(^1\Delta)$ and $O_2(^3\Sigma)$ gas stream containing no $H_2O$ or $H_2O_2$ vapor, and no chlorine. It should be noted that conventional $Cl_2$ traps, such as the Kenics-type trap or the corrugated Teflon tube trap, will work equally well.

In addition to the above basic generator 10, optional cooling jacket 36 having coolant inlet 38 and outlet 40 may be incorporated into generator 10 in order to enhance the reaction efficiency of the generator. Although the reaction will run at ambient, the reaction is exothermic and increased reactor temperature increases pressure and lowers efficiency; thus, by maintaining mixer 12 temperature at about 0° C. undesirable pressure increases can be avoided and reaction efficiency increased.

Wall quenching and hardware quenching have a tendency to cause rapid product deterioration. This problem can be minimized by Teflon coating all surfaces which may come in contact with the active $O_2(^1\Delta)$, or by making Teflon components. This inert surface has the inherent ability to leave undisturbed the $O_2(^1\Delta)$ whereas, should the $O_2(^1\Delta)$ contact a metallic component or wall surface, its energy will be transferred to the metallic surface, thus generating unusable ground state oxygen. It should be noted that wetting of the Teflon surface is a problem which can be solved by conventional surface treatment.

By way of example and not limitation, the following operating parameters are given:

A liquid solution comprising about a 50% aqueous solution of NaOH and about a 90% aqueous solution of $H_2O_2$ are preferably premixed to yield about 1.5 parts NaOH, 6.0 parts $H_2O_2$ and 2.4 parts $H_2O$ and preferably temperature conditioned to from about −20° C. to about 25° C. The most preferred preconditioning temperature is about −15° C. The solution is then conveyed into the mixer 12 where it mixes and reacts with gaseous chlorine. Reaction efficiency is enhanced by maintaining the upstream pressure at about 10–20 torr, while the downstream pressure at the exit zone of the mixer is about 1–4 torr. Although a stoichiometric ratio of reactants will work test results indicate that maintaining a stoichiometric excess of NaOH will provide for a more complete reaction. Specifically, test results for the quarter-inch diameter mixer having 6M NaOH solution teaches that as the mass flow rate of $Cl_2$(g-moles/sec) increases from 0.2 to 2.0 ($\dot{m}Cl_2 \times 10^3$g-moles/sec) the production of oxygen measured in $\dot{m}O_2 \times 10^3$g-moles/sec similarly increases. It should, however, be noted that although the theoretical calculations show a one-to-one relationship of $Cl_2$ to $O_2$, actual results show a slightly lower production rate of $O_2$ and, as the NaOH is consumed, the rate of oxygen production deteriorates.

The $H_2O_2$ used in the present invention has two functions, the first being that of a reactant, and the second being that of the solvent in which the reaction occurs. The present invention teaches that $H_2O_2$ should be used as a solvent instead of water because it can be separated more easily from $O_2(^1\Delta)$ than water.

Test results have indicated that introducing nitrogen into mixer 12 through downstream inlet 44 at a flow rate ranging from about the same flow rate as chlorine gas to a flow rate which is about one order of magnitude greater than the mass flow rate of chlorine reduces gas phase quenching. This phenomenom results from decreasing the partial pressure of the $O_2(^1\Delta)$ while increasing the total system pressure and thus producing a more dilute gaseous solution.

By way of example and not limitation, the following tabulated results are given:

| Flows (mg mol s$^{-1}$) | | Ratios (Molar) | | $O_2(^1\Delta)^{(b)}$ |
|---|---|---|---|---|
| $Cl_2$ | $N_2$ | $O_2:Cl_2^{(a)}$ | $O_2:NaOH^{(a)}$ | |
| 0.1 | 0 | 1:1 | 1:12 | 34.7 |
| 0.1 | 0.37 | 1:1 | 1:12 | 59 |
| 0.1 | 1.0 | 1:1 | 1:12 | 66.9 |
| 0.1 | 1.0 | 1:1 | 1:6 | 72 |
| 0.1 | 1.0 | 0.85:1 | 0.85:2.2 | 71.4 |

$^{(a)}$Stoichiometric is 1:1 and 1:2 for $O_2:Cl_2$ and $O_2:NaOH$ respectively.
$^{(b)}[O_2(^1\Delta)/[O_2(^1\Delta) + O_2(^3\Sigma)]] \times 100$.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A singlet delta oxygen generator, comprises:
   a static mixer having a liquid inlet, a gas inlet, a plurality of left and right-hand helical mixing elements, arranged in alternating sequence, and a product exit zone;
   a liquid gas separator, oriented across said exit zone of said static mixer so that said liquid may be transferred through said separator while the gaseous product stream is diverted away from said liquid by-product; and
   a low-volume trap for freezing water and hydrogen peroxide vapor contained in said gaseous product stream.

2. The singlet delta oxygen generator of claim 1 wherein said mixing elements are arranged in pairs comprising one left and one right hand mixing element.

3. The singlet delta oxygen generator of claim 2 wherein there are three pairs of mixing elements.

4. The singlet delta oxygen generator of claim 2 wherein there are six pairs of mixing elements.

5. The singlet delta oxygen generator of claim 1 further comprising a chlorine trap connected to said low-volume trap for separating non-reacted chlorine from said singlet delta oxygen product stream.

6. The generator of claim 1 wherein the static mixer further comprises a cooling jacket.

7. The generator of claim 1 wherein said mixing elements further comprise a Teflon surface.

8. The singlet delta oxygen generator of claim 1 wherein said liquid/gas separator comprises a porous plate.

9. The singlet delta oxygen generator of claim 1 wherein said low-volume trap comprises a Dewar.

10. A process for generating singlet delta oxygen comprises the steps of:

preparing a solution from 50% aqueous sodium hydroxide and 90% aqueous hydrogen peroxide;

combining said solution with chlorine gas in a static mixer having a liquid inlet, a gas inlet, a plurality of left and right-hand helical mixing elements, arranged in alternating sequence, and a product exit zone;

reacting said sodium hydroxide, hydrogen peroxide and said chlorine gas so as to generate singlet delta oxygen;

passing the reaction products through a liquid/gas separator so as to create a liquid free gaseous product; and conveying said liquid-free gaseous product to a low-volume trap so as to freeze separate water and hydrogen peroxide vapor from said singlet delta oxygen product.

11. The process of claim 10 wherein said sodium hydroxide/hydrogen peroxide solution is temperature conditioned to from about −15° C. to about 25° C. prior to introducing it into said mixer.

12. The process of claim 11 wherein said preconditioning temperature for said solution is about −15° C.

13. The process of claim 10 further comprising conveying said singlet delta oxygen from said low-volume trap and into and through a chlorine trap.

14. The process of claim 10 comprising a stoichiometric excess of sodium hydroxide.

15. The process of claim 10 wherein said hydrogen peroxide functions as reactant and a solvent.

16. The process of claim 10 wherein said static mixer is continuously cooled to a temperature of about 0° C.

* * * * *